United States Patent [19]

Garcia

[11] 4,449,319

[45] May 22, 1984

[54] FLY EXTERMINATOR

[76] Inventor: Gerry R. Garcia, 4180 Rosewood, Saginaw, Mich. 48603

[21] Appl. No.: 267,051

[22] Filed: May 26, 1981

[51] Int. Cl.³ .............................................. A01M 3/00
[52] U.S. Cl. ...................................................... 43/139
[58] Field of Search .................. 43/134, 135, 139, 140, 43/141; 15/339, 344; 173/170

[56] References Cited

U.S. PATENT DOCUMENTS

| | | | |
|---|---|---|---|
| 2,468,469 | 4/1949 | Smith | 173/170 |
| 2,778,150 | 1/1957 | Pohlman | 43/139 |
| 2,829,285 | 4/1958 | Steiner et al. | 173/170 X |
| 3,002,510 | 10/1961 | Wonneman et al. | 173/170 X |
| 3,196,577 | 7/1965 | Plunkett | 43/139 |
| 3,214,861 | 11/1965 | Arther | 43/139 |
| 3,294,182 | 12/1966 | Filander et al. | 173/170 X |
| 4,074,458 | 2/1978 | Catlett | 43/139 |
| 4,175,352 | 11/1979 | Catlett | 43/139 |

FOREIGN PATENT DOCUMENTS

| | | | |
|---|---|---|---|
| 2543336 | 4/1977 | Fed. Rep. of Germany | 43/139 |
| 326893 | 6/1935 | Italy | 43/139 |
| 673669 | 6/1952 | United Kingdom | 15/344 |

Primary Examiner—Nicholas P. Godici
Assistant Examiner—Charles L. Willis
Attorney, Agent, or Firm—John J. Swartz

[57] ABSTRACT

Fly-exterminating apparatus including a housing defining a ring-like columnar passage having an inlet at one end and an outlet on another end, a suction-creating device for drawing a stream of air through the inlet opening, the columnar passage and the outlet opening, and mechanism for impaling the flies at the outlet while permitting the airstream to pass therethrough.

19 Claims, 3 Drawing Figures

FLY EXTERMINATOR

BACKGROUND OF THE INVENTION

1. Field of the Invention

The invention disclosed herein is related to insect exterminating apparatus and more particularily to a hand held fly exterminator having a vacuum unit which will form an airstream that will rapidly carry a fly in a downstream path of travel and a perforated impaling screen disposed in the airstream which will impale and kill the fly.

2. Description of the Prior Art

Insects, such as flies, are noxious pests when they are found in homes, restaurants, offices and other such establishments. Restaurant owners, desirous of creating a sanitary and respectable eating atmosphere, are particularily concerned with the elimination of flies. Common household flies have been heretofore captured with a "sticky" trap that is sometimes suspended from a ceiling. As the flies light on the sticky substance, they are unable to withdraw. Such traps are sometimes considered unsightly and unsanitary. Insects have also been exterminated by the use of insecticides; however, such insecticides permeate the air with an undesirable odor.

Common household flies have generally been considered extremely illusive; however, it has been found that an intake nozzle of a fly exterminator may be pointed directly at, and in close proximity to, a fly which has lighted on an object. Since flies and other such insects will move from station to station, it is desirable that such a fly-exterminating unit be portable. Accordingly, it is an object of the present invention to provide new and improved hand-held, portable, insect-exterminating apparatus which can be pointed toward a fly.

Insects, such as flies, have sometimes been previously controlled by the use of hand-held suction creating devices which trap the insects. Such devices are disclosed, for example, in U.S. Pat. No. 3,214,861 issued to P. E. Arther on Nov. 2, 1965; U.S. Pat. No. 3,196,577 issued to D. M. Plunkett on July 27, 1965; U.S. Pat. No. 4,074,458 issued to Richard E. Catlett on Feb. 21, 1978; and U.S. Pat. No. 4,175,352 issued to Richard E. Catlett on Nov. 27, 1979. Such units operate to trap rather than exterminate the flies. Accordingly, another object of the present invention is to provide hand-held, suction creating apparatus which will draw a fly in an airstream and drive it against a screen with sufficient force to exterminate the fly.

A further object of the present invention is to provide a hand-held fly exterminating apparatus of the type described, which includes mechanism for forming an airstream and mechanism disposed in the airstream for impaling a fly entrained in the air stream.

A still further object of the present invention is to provide a hand-held, gun-type fly exterminating apparatus including a hollow housing having an air inlet and an air outlet and a core disposed in the hollow housing for directing the incoming air, and flies entrained in the airstream in a ring-like columnar path of travel.

Yet another object of the present invention is to provide hand-held insect exterminating apparatus of the type described, including mechanism for forcing an airstream in a ring-like columnar path of travel and an annular impaling mechanism disposed in the airstream which permits the air to pass therethrough but impales the insects in the airstream to kill the insects.

Still another object of the present invention is to provide hand-held, gun-type fly exterminating apparatus of the type described which includes a forwardly converging, conical, hollow intake nozzle.

Another object of the present invention is to provide a hand-held airstream creating fly-exterminating apparatus of the type described having a mechanism disposed in the airstream for interrupting the passage of flies in the airstream to kill the flies mounted on a detachably mounted fly reservoir.

Other objects and advantages of the present invention will become apparent to those of ordinary skill and art as the decription thereof proceeds.

SUMMARY OF THE INVENTION

Hand-held insect exterminating apparatus comprising: a hollow cylindrical housing including a passage therein having a forwardly disposed air inlet and an air outlet; a suction creating mechanism for drawing a stream of air, including insects entrained in the stream of air, in a downstream path of travel into the passage through said inlet and outwardly therefrom through said outlet; and insect impaling mechanism disposed in the path of the airstream for impaling and killing insects entrained in the airstream.

BRIEF DESCRIPTION OF THE DRAWINGS

The present invention may more readily be understood by reference to the accompanying drawing, in which.

DESCRIPTION OF THE INVENTION

Figure 1:
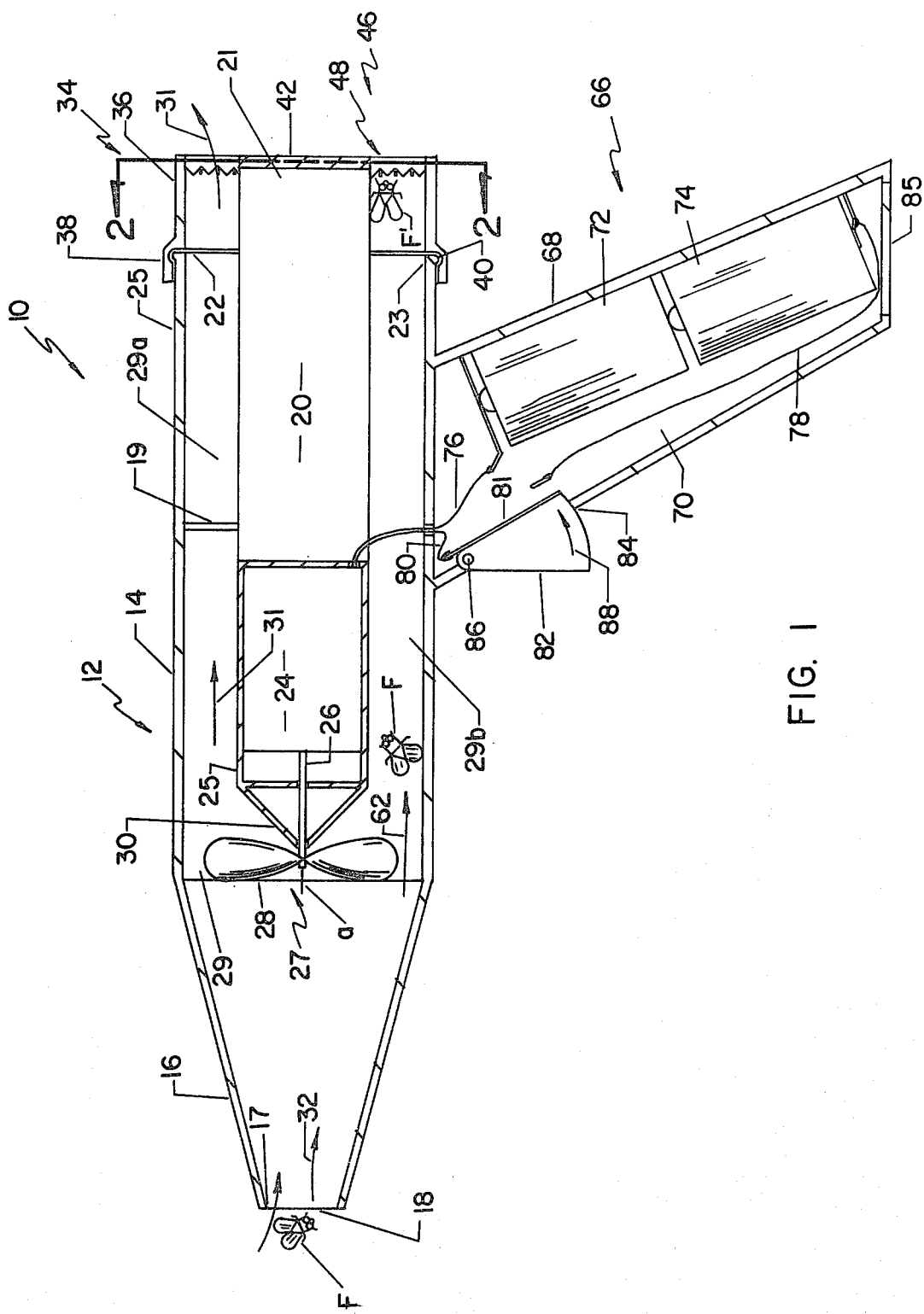
FIG. 1 is a sectional side view, taken along the line 1—1 of FIG. 2.

Fly-exterminating apparatus constructed according to the present invention, generally designated 10, includes a hollow, cylindrical housing, generally designated 12, having a hollow intermediate tubular section 14 and a forwardly converging frusto-conical, hollow nozzle 16 which includes a forward terminal annular end 17 defining an air inlet opening 18. The hollow tube or jacket 14 includes a rear annular terminal end 22 defining a rear outlet 23.

Disposed within the jacket or tube 14, via circumferentially spaced, radially extending struts 19, is a motor mounting, cylindrical, air impervious core 20. It will be noted that the rear portion 21 of the core 20 projects axially rearwardly, outwardly beyond the rear terminal end 22 of the jacket 14.

An electrical energized, DC motor 24 is disposed within a hollow motor casing 25 which is mounted on the forward end of the core 20. The motor 24 includes a rotary drive shaft 26, rotatable about an axis a, mounting a conventional fan, generally designated 27, having a plurality of circumferentially spaced fan blades 28. The casing 25, core 20, and the tubular casing 14 thus define an annular or ring-like column air passage 29 having axially aligned, forward and rearward, columnar air passage portions 29a and 29b respectively.

The fan 27, when rotated, will operate to force air axially rearwardly in the direction of the arrow 31 through the outlet 23 to create a vacuum which will draw ambient air, represented by the arrows 32, into the passage 29 through the inlet 17. A cone-shaped shroud 30 is mounted on the forward end of the motor casing 25, rearwardly of the fan 28, for directing the air 32 radially outwardly into the columnar passage 29. The vaccuum created by operation of the fan 28 is sufficient such that flys, generally designated F, will be drawn into the passage 29 via the inlet 17 and outwardly through the outlet 23.

Figure 2:
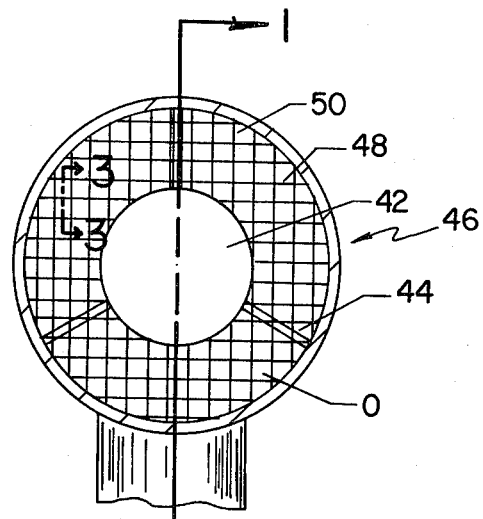
FIG. 2 is a sectional end view, taken along the line 2—2 of FIG. 1.
Figure 3:
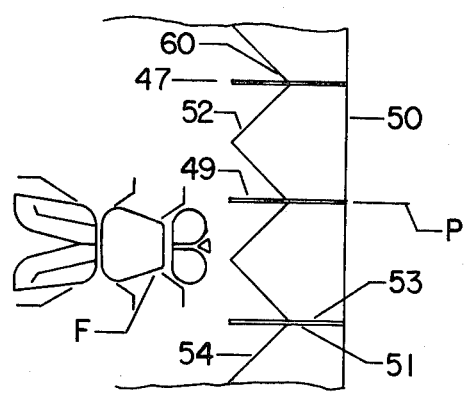
FIG. 3 is an enlarged, fragmentary side elevational view, taken along the line 3—3 of FIG. 2, more particularily illustrating the fly-impaling mechanism.

Mounted on the rearward end 22 of the housing 14 is a fly-impaling and reservoir cap or cover, generally designated 34, including a hollow cylindrical reservoir casing 36 which has a diameter and wall thickness equal to the diameter and wall thickness, respectively, of the intermediate tube 14. A snap ring 38 is provided on the forward end of the rearward reservoir casing 36 for detachably receiving an annular rib 40 provided on the rear 22 of the forwardly disposed casing 14. The fly impaling and reservoir closure cover 34 includes a central screen mounting cap portion 42, axially aligned with and abutting the core 21, coupled to the annular reservoir casing 36 via a plurality of circumferentially spaced ribs 44 (FIG. 2). Fly impaling mechanism, generally designated 46, is provided on the cover 34 and includes a screen or mesh, generally designated 48, comprising a plurality of horizontally spaced parallel strands or strips 49 interlaced with identically shaped, vertically spaced parallel strands or strips 50. The forward edges 47 of the strips 49 and 50 include a plurality of V-shaped notches 54, having roots 60, defining a plurality of forwardly projecting, fly penetrating teeth or pales 52. The strips 49 and 50 include a plurality of complementary notches 51 and 53 lying in parallel planes P intersecting the roots 60. The strips 49 and 50, which are disposed at right angles to each other, thus define openings O therebetween, each having a cross-sectional area which is slightly smaller than the cross-sectional area of insect or fly F to be exterminated. The complementary notches 51 and 53 thus permit the strips 50 and 49 to be snugly mounted together. The strips 49 and 50 span the central screen mounting cap portion 42 and the annular casing 36. The flies F will be rearwardly carried in the airstream, in the direction of the arrows 62, with sufficient velocity that the flies will be killed when they are impaled on the sharp teeth 52.

The flies F, which have been killed, designated F', will collect in the reservoir cover 34 and can be easily removed by merely removing the casing 36 from the casing 14 and emptying the contents thereof.

A handle 66 is mounted along the underside of the casing 14 and includes a tubular sidewall 68 defining a battery compartment 70 which receives batteries 72 and 74 as usual. Electrical leads 76, 78 and 80 electrically couple the batteries 72 and 74 in series circuit reltionship with the motor 24 and a normally open switch 80. The switch 81 is fixed to a trigger 82 received in an opening 84 provided in the tubular housing 68. When the operator desires to utilize the device, the trigger 82, which is pivotally mounted on the handle 66, via a pin 86, is moved inwardly in the direction of the arrow 88, to close the switch 81 and couple the line 80 with the line 78 to energize the motor 24. A pivotally mounted closure door 85 is provided at the lower end of the hollow handle 66 to provide access to the battery compartment 70.

THE OPERATION

The user will manually grasp the unit 10, similar to grasping a gun, and direct the nozzle 16 at a fly F to be exterminated. The trigger 82 is actuated to complete the circuit between the batteries 72, 74, and the motor 24 to energize the motor 24, which drives the fan 27 and forces air outwardly of the columnar passage 29, in the direction of the arrow 31, causing a vacuum which will draw air inwardly to the passage 29 through the inlet 18. The vacuum created in the passage 29 will cause the fly F to be sucked or drawn inwardly through the inlet 17, the passage 29 and thence outwardly through the outlet 23 against the impaling teeth 52. As the fly F strikes the teeth 52, the teeth 52 will pierce and kill the fly F. After the fly designated F' has been killed, the trigger 82 is released. The operation is repeated when another fly is to be exterminated. The user may dispose of the exterminated flys F' by merely removing the reservoir cover 34. It is to be understood that the drawings and descriptive matter are in all cases to be interpreted as merely illustrative of the principles of the invention, rather than as limiting the same in any way, since it is contemplated that various changes may be made in various elements to achieve results without parting from the spirit of the invention or the scope of the appended claims.

What I claim is:

1. Hand-held insect exterminating apparatus comprising:
    a hollow longitudinally extending housing including a passage therein having a forwardly disposed air inlet and an air outlet;
    suction creating means for drawing a stream of air in a down-stream path of travel into said passage through said inlet and outwardly therefrom through said outlet; and
    insect impaling means, disposed in the path of said stream of air, for killing any insects entrained in said air stream;
    said insect impaling means comprising a screen for interrupting the passage of insects but including openings therethrough permitting the passage of air;
    said screen including a plurality of forwardly projecting insect exterminating pales.

2. The apparatus set forth in claim 1 wherein said housing includes a hollow annular casing and a hollow, uniformly/forwardly converging conically shaped rigid nozzle mounted on the forward end of said casing, the forward terminal end of said nozzle defining said inlet; the axial length of said nozzle being less than the axial length of said hollow annular casing.

3. The insect exterminating apparatus set forth in claim 1 wherein each of said pales includes opposite sides which forwardly converge to provide sharpened insect impaling teeth.

4. The insect exterminating apparatus set forth in claim 1 or 3 wherein said screen comprises an annular mesh ring having a central opening therein.

5. The insect exterminating apparatus set forth in claim 4 including a cylindrical core member disposed in said passage in spaced relation with said housing to define a hollow columnar channel for said airstream; said impaling means including a cap having a mounting ring detachably mounted on a rear portion of said housing adjacent said outlet and a central screen mounting member, abutting a rear portion of said cylindrical core member, mounting said screen adjacent said outlet.

6. The insect exterminating apparatus set forth in claim 5 wherein said suction-creating means comprises a fan disposed in said passage and a fan-driving motor mounted on a forward portion of said cylindrical member.

7. The insect-exterminating apparatus set forth in claim 6 wherein said housing includes a hollow handle portion, along the underside thereof, having a battery-receiving receptacle therein; a battery disposed in said receptacle; circuit means for electrically coupling said motor with said battery; said circuit means includes switch means mounted on said handle for selectively coupling said motor and said battery.

8. The insect-exterminating apparatus set forth in claim 1 wherein said housing includes a forward hollow cylindrical casing having a rearward end defining a rearward opening said apparatus further including a rearward hollow cylindrical reservoir casing detachably mounted on said housing for receiving and storing exterminated flies; a cylindrical core member having a forward portion received by and fixed to said forward casing and a rear portion received by said rear casing; said impaling means comprising a central screen mounting member axially aligned with said cylindrical core member and an annular screen spanning said rearward hollow reservoir casing and said central screen mounting member.

9. The insect-exterminating apparatus set forth in claim 1 wherein said suction creating means comprises fan means for forcing air out of said housing through said outlet opening to create a vacuum that will draw a stream of air, and insects entrained in said airstream, into said inlet.

10. The insect-exterminating apparatus set forth in claim 1 wherein said housing includes a hollow, axially extending tube; said apparatus further comprising a cylindrical motor mounting core mounted in a rearward portion of said passage in radially spaced relation with said tube to define a rearward annular columnar, radially uniform passageway for said airstream; motor means mounted on a forward portion of said motor mounting core in radially spaced relation with said tube to define a forward annular passageway for said airstream generally axially aligned with said rearward annular columnar passageway; said suction-creating means comprising a fan drivingly coupled to, and disposed forward of, said motor means; and a cone-shaped member stationarily disposed between said fan and said motor means for directing said airstream radially outwardly toward said forward annular columnar passageway.

11. Hand-held fly exterminating apparatus comprising:
   a hollow elongate housing including forward and rearward end portions having air inlet and air outlet openings respectively;
   suction creating means, disposed within said housing, for drawing a stream of air through said inlet opening, said housing, and said outlet opening;
   impaling means disposed in the path of said stream of air for piercing and exterminating any flies entrained in said airstream; and
   cylindrical core means disposed within but spaced from said housing to define an annular columnar passageway for said airstream and said flies; said impaling means comprising an annular screen mesh having a plurality of strands of material defining air passages therebetween;
   said strands including forwardly projecting pales.

12. The fly-exterminating apparatus set forth in claim 11 including a cap detachably mounted on said housing adjacent said outlet opening, said impaling means being mounted on said cap.

13. The fly-exterminating apparatus set forth in claim 12 wherein said cap includes a central cap section axially aligned with said cylindrical means and a radially spaced annular cap section, said impaling means comprising an annular ring of screen material for interrupting the passage of said insects but having openings therein permitting the outward passage of said airstream.

14. The fly-exterminating apparatus set forth in claim 11 wherein said housing includes a hollow, nozzle portion, at the forward end thereof, said nozzle having a hollow conically shaped, forwardly converging sidewall, the forward terminal end of said sidewall defining said inlet.

15. The fly-exterminating apparatus set forth in claim 11 wherein said mesh includes forwardly projecting pales for penetrating and killing said flies.

16. The fly-exterminating apparatus set forth in claim 11 wherein said plurality of strands comprises first and second pluralities of spaced-apart strips of material each having a forward edge and a rearward edge; the forward edges of said strips having a plurality of forwardly projecting, fly-impaling teeth separated by notches; said first and second pluralities of strips being disposed transversely relative to each other to define said passages therebetween for the passage of air.

17. Fly exterminating apparatus comprising:
   a generally hollow, longitudinally extending housing including forward and rearward end portions having air inlet and air outlet openings respectively;
   longitudinally extending core means disposed within but radially spaced from said housing define a longitudinally extending annular passage therebetween;
   a screen, disposed adjacent said outlet, having openings therethrough which permit the passage of air;
   fan means on said core means for forcing air out of said passage through said outlet opening to create a vacuum that will draw air through said inlet to provide a stream of air for carrying flies through said passage and into said screen with sufficient force to kill said flies; and
   an axially extending, cylindrical reservoir ring detachably mounted on a rear portion of said housing and a central screen mounting section axially aligned with said core means, said screen comprising an annular mesh spanning said reservoir ring and said central screen mounting section for interrupting the passage of any flies entrained in said airstream.

18. Hand-held insect exterminating apparatus comprising:
   a hollow elongate housing including a forward terminal end provided with a forwardly disposed air inlet, said housing further including a hollow cylindrical jacket terminating in a rearward end defining a rearwardly opening air outlet, and a passage between said inlet and outlet;
   suction creating means disposed in said passage for drawing a stream of air in a downstream path of travel into said passage through said inlet and outwardly therefrom through said outlet;
   perforate means, disposed on said housing in the path of said stream of air, for axially passing said stream of air but interrupting the passage of any insects entrained in said air stream;

a rearward hollow cylindrical reservoir casing detachably mounted on said rearward end of said jacket for receiving and storing any insects impacting said perforate means; and a cylindrical core member having a forward portion received by and fixed to said jacket and a rear portion received by said reservoir casing;

said perforate means comprising a stationary central screen mounting member axially aligned with said cylindrical core member and an annular screen spanning said rearward hollow reservoir casing and said central screen mounting member.

19. Hand-held insect exterminating apparatus comprising:

a hollow longitudinally extending housing including a passage therein having a forwardly disposed air inlet and a rearwardly disposed air outlet;

suction creating means for drawing a stream of air, in a downstream path of travel into said passsage through said inlet and outwardly therefrom through said outlet;

perforate means disposed on said housing, at said outlet, in the path of said stream of air, for axially passing said stream of air but interrupting the passage of any insects entrained in said air stream;

said housing including a hollow, axially extending tube; and a cylindrical motor mounting core mounted in a rearward portion of said passage in radially spaced relation with said tube to define a rearward annular, radially uniform passageway for said airstream;

said suction creating means comprising motor means mounted on a forward portion of said motor mounting core in radially spaced relation with said tube to define a forward annular passageway for said airstream generally axially aligned with said rearward annular passageway and a fan drivingly coupled to said motor means;

the radial extent of said forward and rearward annular passageways being substantially uniform throughout the axial length of said forward and rearward annular passageways.

* * * * *